Aug. 16, 1932.  G. A. KING ET AL  1,872,001
CARPET FASTENER
Filed July 15, 1931    2 Sheets-Sheet 2

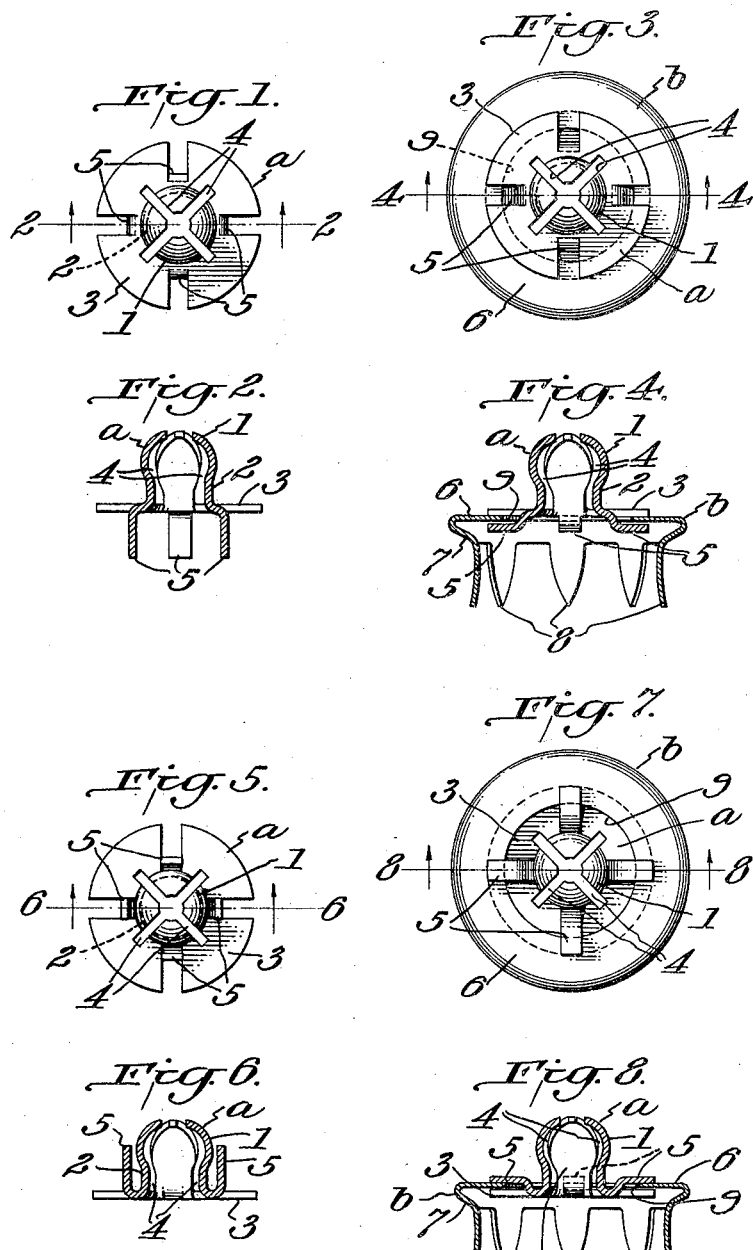

Inventors
George A. King
Frederick Trocke
by Wm. H. Finckel
Attorney

Patented Aug. 16, 1932

1,872,001

UNITED STATES PATENT OFFICE

GEORGE A. KING AND FREDERICK TROSKE, OF WATERBURY, CONNECTICUT, ASSIGNORS TO SCOVILL MANUFACTURING COMPANY, OF WATERBURY, CONNECTICUT, A CORPORATION OF CONNECTICUT

CARPET FASTENER

Application filed July 15, 1931. Serial No. 550,998.

This invention relates to carpet and the like fasteners, and particularly to such fasteners of the floating type comprising a fastener element and a casing element relatively laterally shiftable to accommodate inaccuracies in axial alignment of the complemental elements of separable fasteners arranged upon movable articles and relatively fixed parts respectively.

The object of the invention is to provide a fastener of the type mentioned of such simple and cheap construction that it lends itself readily to rapid and economical manufacture in large quantities.

The invention consists in a carpet fastener or the like, comprising two parts, a fastener element and a casing element, these parts being so formed that they may be assembled in relative laterally shiftable or floating relation, as will be explained hereinafter more fully and finally claimed.

Figure 9:
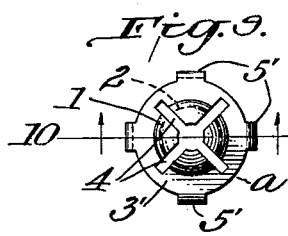
Figure 11:
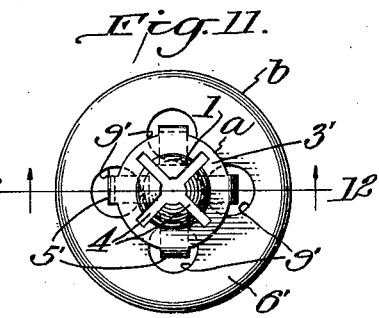
Figure 12:
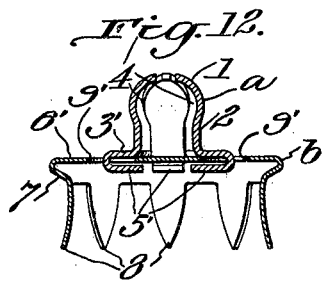
Figure 13:
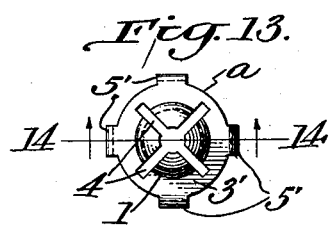
Figure 15:
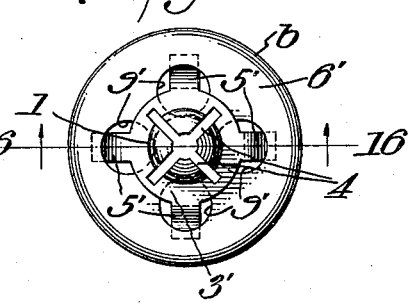
Figure 14:
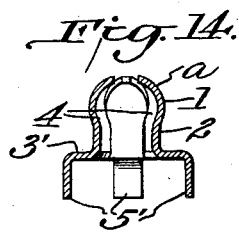
Figure 16:
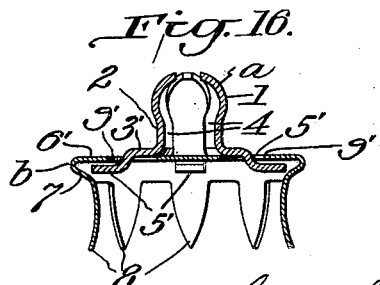

In the accompanying drawings illustrating the invention, in the several figures of which like parts are similarly designated, Figure 1 is a plan view of one form of fastener element embodying the features of the invention, and Fig. 2 is an axial section thereof, taken on line 2—2 of Fig. 1. Fig. 3 is a plan view of the fastener element of Fig. 1 assembled with a casing element in one manner contemplated by the invention, and Fig. 4 is an axial section taken on line 4—4 of Fig. 3. Fig. 5 is a plan view of a fastener element similar to that of Figs. 1 and 2 but embodying a modified arrangement of its fingers, and Fig. 6 is an axial section taken on line 6—6 of Fig. 5. Fig. 7 is a view similar to Fig. 3 in which the fastener element of Fig. 5 is employed, and Fig. 8 is an axial section taken on line 8—8 of Fig. 7. Fig. 9 illustrates a modified form of fastener element in which the fingers extend radially from the periphery of the base as distinguished from the fastener elements of Figs. 1 to 8, and Fig. 10 is an axial section taken on line 10—10 of Fig. 9. Fig. 11 is a plan view of the fastener element of Fig. 9 assembled with a casing element embodying structural differences from that of Figs. 3 and 7, and Fig. 12 is an axial section taken on line 12—12 of Fig. 11. Fig. 13 is a plan view, and Fig. 14 is an axial section on line 14—14 of Fig. 13, showing a fastener element the same in all essential characteristics as that illustrated in Fig. 9, but assembled in a different manner, as shown in Figs. 15 and 16. Fig. 15 is a plan view and Fig. 16 is an axial section taken on line 16—16 of Fig. 15 showing this different manner of assembly utilizing the same type of casing member as that illustrated in Fig. 11.

As hereinbefore explained, the fastener of the invention comprises two essential elements, namely a fastener element proper and a casing element proper, and the reference characters $a$ and $b$ will be used to designate these two parts respectively throughout the several figures regardless of the modifications which they may embody.

Although it will be understood that the invention is not thereby limited, the fastener element $a$ is shown as the stud element of a separable fastener and comprises a head 1, a shank 2, and a laterally extending base portion 3. The head and shank are slitted, as indicated at 4, to provide the resiliency necessary to produce proper snap action with a rigid or non-resilient complemental socket member (not shown).

As shown in Figs. 1, 2, 5 and 6, the base portion 3 is recessed or slitted to provide offstanding deformable fingers 5 which, for purposes of assembly, may be initially bent away from the shank 2, as shown in Figs. 1 and 2, or around it, as shown in Figs. 5 and 6.

The casing element $b$ of Figs. 3, 4, 7 and 8 comprises a plate 6 having a rim 7 offstanding from it, and from this rim extend prongs 8 which serve as a means for securing or fastening the fastener to a carpet or other article in a well known manner, and the plate 6 is provided with an aperture 9 whereby the fastener element $a$ may be connected with the casing element in laterally shiftable or floating arrangement.

As shown in Figs. 3 and 4, the fastener element $a$ is arranged with its base portion 3 at the outer face of the plate 6 and its fingers 5 so bent as to lie at the inner face of the plate. As will be apparent, the diameter of the aperture 9 is less than the diameter of the base portion 3 and also less than the length of the fingers 5 when they are bent as shown, and hence, although the fastener element and casing element are capable of free relative lateral shifting or floating, they cannot become separated.

The arrangement of the fastener element and casing element as shown in Figs. 7 and 8 differs from that just described only in that the base portion 3 lies at the inner face of the plate 6, the head 1 and shank 2 extend through the aperture 9 and the fingers 5 are passed outwardly through the aperture 9 and lie at or against the outer face of the plate.

Figure 10:
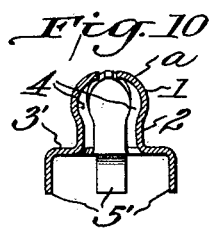

The fastener element *a* as shown in Figs. 9, 10, 13 and 14 has a head 1 and shank 2, similar to those just described, and is slitted, as indicated at 4, to provide resiliency. The base portion 3′, however, is recessed at its peripheral edge to provide the offstanding fingers 5′, and is of less diameter than the base portion 3 just previously described so that the fingers project from its periphery and are initially bent as shown in Figs. 10 and 14.

The modified casing element *b* of Figs. 11, 12, 15 and 16 has a plate 6′, a rim 7 and attaching prongs 8 similar to those already described, but the plate 6′ is provided with a plurality of spaced apertures 9′ so arranged and of such size that when the fingers 5′ are passed through them and bent to assembling position, either inwardly, as shown in Figs. 11 and 12, or outwardly, as shown in Figs. 15 and 16, sufficient play will be permitted to afford the lateral shifting or floating action desired.

It will be apparent, from an inspection of Figs. 4, 8, 12 and 16, that the rim 7 of the casing element *b* supports the casing element in spaced relation to the carpet or other article to which it is applied, and thus ensures the free floating of the fastener element *a* relatively thereto, as its parts 3 and 5 or 5′ will be free of undesirable frictional or other material contact with the carpet or article.

Moreover, as will be seen, the rim 7 provides an offstanding bead against which the prongs 8 may be upset and by which they may be protected and concealed in a known manner when the fastener is applied to a carpet or other article.

Conceivably, the fastener elements *a* of Figs. 1 and 5 may be used with the casing element *b* of Figs. 11 and 16, but the fastener element of Figs. 9 and 13 could not be used effectively with the casing element of Figs. 3 and 7 because of the relative diameters of the aperture 9 and base portion 3′.

Various changes and modifications are contemplated as within the spirit of the invention and the scope of the following claims.

What we claim is:—

1. In a carpet fastener, a snap fastener element including a laterally extending base portion slitted adjacent to its periphery to provide a plurality of deformable fingers, and a casing element including an apertured plate and means whereby the casing element may be fastened to an article, the fastener element arranged with its base portion adjacent to one face of said plate and having its fingers passed through the plate by virtue of the apertured formation thereof and bent into proximity to the other face of the plate to mount said fastener element upon said casing element, and the apertured formation of the plate being of such proportions as to provide for a laterally shiftable mounting of said fastener element relatively to said casing element.

2. In a carpet fastener, a snap fastener element having a laterally extending base slitted adjacent to its periphery to provide a plurality of bendable fingers, a fastener part extending from said base, and a casing element including a plate provided with means for attaching it to an article and having an aperture, said fastener element carried by said casing element with its base adjacent to one face of the plate and its fingers extending through said aperture and bent for engagement with the other face of the plate, said aperture being of a size to permit lateral shifting of said fingers therein, whereby the fastener element and casing element are assembled in laterally shiftable relation.

3. In a carpet fastener, a snap fastener element having a laterally extending base slitted adjacent to its periphery to provide a plurality of bendable fingers, a fastener part extending from said base, and a casing element including a plate provided with means for attaching it to an article and having an aperture of greater diameter than said fastener part but of less diameter than said base, said fastener element carried by said casing element with its base adjacent to one face of the plate and its fingers extending through said aperture and bent for engagement with the other face of the plate, whereby the fastener element and casing element are assembled in laterally shiftable relation.

4. In a carpet fastener, a snap fastener element provided with a laterally extending base slitted adjacent to its periphery to provide a plurality of bendable fingers, and a casing element including an apertured plate having a rim offstanding from one face thereof and provided with means for attaching the fastener to an article, said fastener element so arranged relatively to said plate that said base lies adjacent to one face thereof, the apertured formation of said plate permitting said fingers to pass therethrough and be bent for engagement with the other face thereof and being of such proportions as to permit lateral shifting of said fingers and hence of said fastener element relatively to the plate, and said rim providing a sufficient clearance between said plate and the article to which the fastener is attached to ensure free lateral shifting of said fastener element relatively to said casing element.

5. In a carpet fastener, a snap fastener element having a laterally extending base portion recessed at its peripheral edge to provide a plurality of offstanding deformable fingers, and a casing element including an apertured plate and means whereby the casing element may be fastened to an article, the fastener element arranged with its base portion adjacent to one face of said plate and having its fingers passed through the plate by virtue of the apertured formation thereof and bent into proximity to the other face of the plate to mount said fastener element upon said casing element, and the apertured formation of the plate being of such proportions as to provide for a laterally shiftable mounting of said fastener element relatively to said casing element.

6. In a carpet fastener, a snap fastener element having a snap fastener part and a base portion provided with a plurality of offstanding deformable fingers, and a casing element including a plate and means for attaching it to an article, said plate provided with a plurality of apertures, said snap fastener element arranged with its base portion at one face of said plate and said fingers passed through said apertures and bent into proximity to the other face of said plate to connect said fastener element and casing element, the arrangement of said fingers relatively to said apertures permitting free lateral shifting of said fastener element relatively to said casing element.

7. In a carpet fastener, a snap fastener element having a snap fastener part and a base portion provided with a plurality of offstanding deformable fingers, and a casing element including a plate and means for attaching it to an article, said plate provided with a plurality of apertures spaced in substantial conformity to the arrangement of said fingers and adapted to receive said fingers, said snap fastener element arranged with its base portion at one face of said plate and said fingers passed through said apertures and bent relatively to said plate to connect said fastener element and casing element, the arrangement of said fingers relatively to said apertures permitting free lateral shifting of said fastener element relatively to said casing element.

In testimony whereof we have hereunto set our hands this 13th day of July, A. D. 1931.

GEORGE A. KING.
FREDERICK TROSKE.